United States Patent
Saito et al.

(10) Patent No.: US 8,417,576 B2
(45) Date of Patent: Apr. 9, 2013

(54) INFORMATION TRANSMITTING APPARATUS, INFORMATION TRANSMITTING METHOD, INFORMATION TRANSMITTING AND PROCESSING PROGRAM, AND INFORMATION TRANSMITTING SYSTEM

(75) Inventors: Hotaka Saito, Shinagawa-ku (JP); Yumi Wada, Shinagawa-ku (JP)

(73) Assignee: Rukuten, Inc., Tokyo (JP)

( * ) Notice: Subject to any disclaimer, the term of this patent is extended or adjusted under 35 U.S.C. 154(b) by 0 days.

(21) Appl. No.: 12/994,062

(22) PCT Filed: Jun. 8, 2009

(86) PCT No.: PCT/JP2009/060456
§ 371 (c)(1),
(2), (4) Date: Nov. 22, 2010

(87) PCT Pub. No.: WO2010/007842
PCT Pub. Date: Jan. 21, 2010

(65) Prior Publication Data
US 2011/0078054 A1 Mar. 31, 2011

(30) Foreign Application Priority Data
Jul. 15, 2008 (JP) ................................. 2008-183735

(51) Int. Cl.
*G06Q 30/00* (2012.01)
(52) U.S. Cl.
USPC ....... 705/26.1; 705/26.2; 705/26.8; 705/27.1; 707/999.01; 707/E17.108
(58) Field of Classification Search ................. 705/26.1, 705/26.2, 26.8, 27.1; 707/999.01, E17.108
See application file for complete search history.

(56) References Cited

U.S. PATENT DOCUMENTS

| | | | | |
|---|---|---|---|---|
| 2004/0205005 | A1 * | 10/2004 | Matsunaga | 705/26 |
| 2006/0238547 | A1 | 10/2006 | Spencer et al. | |
| 2008/0098300 | A1 * | 4/2008 | Corrales et al. | 715/243 |
| 2009/0234682 | A1 * | 9/2009 | Baggett et al. | 705/6 |

FOREIGN PATENT DOCUMENTS

| | | |
|---|---|---|
| JP | 10-091711 A | 4/1998 |
| JP | 2002-150095 A | 5/2002 |

(Continued)

OTHER PUBLICATIONS

Extended European Search Report issued in counterpart European Patent Application No. 09797770.6 dated Aug. 21, 2012.

(Continued)

*Primary Examiner* — Yogesh C Garg
(74) *Attorney, Agent, or Firm* — Sughrue Mion, PLLC (57) ABSTRACT

There are provided an information transmitting apparatus, an information transmitting method, an information transmitting and processing program, and an information transmitting system capable of transmitting information such as a web page displaying stock quantity or the like while realizing the decreased number of times of obtaining stock quantity and lessening a process burden. In the case where a request for a hypertext generating page information is received, a hypertext including tag information having location information defining location of image data corresponding to stock quantity is transmitted to a terminal device, and the tag information displays the image data. In the case where a request including the location information is received from the terminal device which received the hypertext, stock-quantity information defining the stock quantity corresponding to the location information is obtained from a database. Image data indicating the stock quantity shown by the obtained stock quantity information in characters is generated. The generated image data is transmitted to the terminal device.

6 Claims, 5 Drawing Sheets

FOREIGN PATENT DOCUMENTS

JP     2003-108797 A     4/2003
JP     2006-079408 A     3/2006

OTHER PUBLICATIONS

Jason Hunter et al., "Chapter 6: Sending Multimedia Content, Chapter 9: Database Connectivity", In: "Java Servlet Programming", Oct. 1, 1996, O'Reilly, XP55035053.

Jaine Pramod, "Data-Driven SVG Apps: A Rapid Development Approach", O'Reilly on Java.com. Feb. 13, 2002, XP55035056.

John Chamberlain, "Building Web applications in Domino 6: Browser caching and response header rules", Internet Citation, Oct. 2002, pp. 1-10, XP002553293.

Hiroshi Yuki, "C&Perl de Manabu CGI Lesson (Dai 13 kai) Gazo Ittaigata Access Counter", C Magazine, May 1, 2009, pp. 85-91, vol. 11, No. 5.

\* cited by examiner

XXXX IN STOCK

JAN 10000000994

SPECIAL PRICE  5,000 YEN   DELIVERY FEE IS NOT INCLUDED   [ 975 ] IN STOCK

QUANTITY OF ORDER: [ 1 ]   THE NUMBER OF ORDERS TO BE RECEIVED: NO RESTRICTION

[ PUT INTO CART ]

APPLY FOR PRESENT                INQUIRY
SUBSCRIBE TO EMAIL PUBLICATION

PICKUP AT CONVENIENCE STORE : OK
PACKING SIZE : 200 cm    TARE : 100g

\>\>SETTLEMENT/DELIVERY 200
201

```
<!DOCTYPE HTML PUBLIC "-//W3C//DTD HTML 4.01 Frameset//EN"
"http://www.w3.org/TR/html 4/frameset.dtd">
<HTML lang="ja">
          •
          •
          •
<BODY>
          •
          •
          •
REMAINING
151 —— <IMG src="xxxxxxxx_zaikosu.gif">   width="10"height="5">
          •
          •
          •
<BODY>
</HTML>
```

FIG.5

//www.w3.org/1999/xhtml">
INFORMATION TRANSMITTING APPARATUS, INFORMATION TRANSMITTING METHOD, INFORMATION TRANSMITTING AND PROCESSING PROGRAM, AND INFORMATION TRANSMITTING SYSTEM

CROSS REFERENCE TO RELATED APPLICATIONS

This application is a National Stage of International Application No. PCT/JP2009/060456, filed on Jun. 8, 2009, which claims priority from Japanese Patent Application No. 2008-183735, filed on Jul. 15, 2008, the contents of all of which are incorporated herein by reference in their entirety.

TECHNICAL FIELD

The present invention relates to a technical field of an information transmitting apparatus, an information transmitting method, an information transmitting and processing program, and an information transmitting system for transmitting a web page or the like displaying the stock quantity of commodities or the like to a terminal device.

BACKGROUND ART

Conventionally, a shopping system is known, which enables a user to be connected to a network such as the Internet using a terminal device such as a personal computer to make a deal on a commodity, service, and the like via a web page provided from a web server or the like.

In such a system, stock quantity is generally displayed on a web page displaying information on commodities, service, and the like to be dealt.

For example, Patent Document 1 discloses a method of displaying stock quantity in a figure on a terminal device of a user.

The stock quantity of an object to be dealt is usually registered in a database so as to be associated with the object. Information about the stock quantity registered in the database is updated so that the stock quantity which changes moment by moment according to the situation of a deal is reflected. Therefore, the web server has to inquire of the database the stock quantity each time a request for a web page displaying the stock quantity is received.

DOCUMENT OF RELATED ART

Patent Document

Patent Document 1: Japanese Patent Application Laid-Open No. H10-91711

SUMMARY OF THE INVENTION

Problem to be Solved by the Invention

However, in the above-described conventional method, each time stock quantity has to be displayed, a database has to be accessed. There is consequently such a problem that a delay in processing is caused by an access to the database.

The method disclosed in the Patent Document 1 has the same problem. In the method, a figure is formed every 10 seconds. However, in order to generate a figure image corresponding to changes in the stock quantity, a database has to be accessed each time the image is generated.

The present invention has been achieved in view of the above point, and it is an object of the invention to provide an information transmitting apparatus, an information transmitting method, an information transmitting and processing program, and an information transmitting system capable of transmitting information such as a web page displaying stock quantity or the like while realizing the decreased number of times of obtaining stock quantity and lessening a process burden.

Means for Solving the Problem

In order to solve the above problem, the invention according to claim 1 relates to an information transmitting apparatus for transmitting page information displaying stock quantity via a network to a terminal device, the terminal device displaying received data on displaying means thereof, storing the data in storing means provided for itself, and the terminal device, in the case where data to be received is already stored, obtaining the data from the storing means, and displaying the data on the displaying means, the information transmitting apparatus comprising:

request receiving means for receiving a request transmitted from the terminal device;

hypertext transmitting means, in the case where a request for a hypertext generating the page information is received, for transmitting a hypertext, to the terminal device, including tag information having location information defining location of image data corresponding to the stock quantity, and the tag information displaying the image data;

stock-quantity information obtaining means, in the case where a request including the location information is received from the terminal device which received the hypertext, for obtaining stock-quantity information defining the stock quantity corresponding to the location information from a database;

image data generating means for generating image data indicating stock quantity shown by the obtained stock-quantity information in characters; and image data transmitting means for transmitting the generated image data to the terminal device.

According to the invention, the information transmitting apparatus transmits a hypertext including tag information having location information of image data displaying stock quantity in characters, to a terminal device. The terminal device displays the characters of the stock quantity in the form of an image on the basis of tag information included in the hypertext. In the case of displaying the stock quantity for the first time, since the image data is not stored in the storing means, the terminal device transmits a request to the information transmitting apparatus. In response to the request, the information transmitting apparatus obtains the stock-quantity information from a database, generates image data displaying the image indicated by the stock-quantity information in the form of characters, and transmits the resultant data to the terminal device. The terminal device which has received the image data displays the image data on the displaying means and also stores it in the storing means. Once the image data is stored in the storing means, the terminal device displays the stored image data on the displaying means without transmitting a request to the information transmitting apparatus. Since the information transmitting apparatus naturally does not receive the request for the image data, it does not have to obtain the stock-quantity information from the database. Therefore, the number of times of obtaining the stock-quantity information from the database by the information transmitting apparatus can be decreased.

The invention according to claim 2 relates to the information transmitting apparatus according to claim 1, wherein in the case where a term of validity of data stored in the storing means expires, the terminal device sends a request for requiring the data, and the image data transmitting means adds header information defining a term of validity of the generated image data to the image data, and transmits the resultant data to the terminal device.

According to the present invention, even in the case where the terminal device stores image data once, when a term of validity of the image data expires, the terminal device newly receives image data from the information transmitting apparatus, and displays it on the displaying means. By properly setting a term of validity, while lessening the process burden on the information transmitting apparatus, the stock quantity displayed on the displaying means of the terminal device can be made close to the latest information registered in the database.

The invention according to claim 3 relates to an information transmitting method of transmitting page information displaying stock quantity via a network to a terminal device, the terminal device displaying received data on displaying means thereof, storing the data in storing means provided for itself, and the terminal device, in the case where data to be received is already stored, obtaining the data from the storing means, and displaying the data on the displaying means, the method comprising:

a hypertext request receiving process of receiving a request for a hypertext generating the page information, which is transmitted from the terminal device on the basis of an instruction from the user;

a hypertext transmitting process, in the case where a request for a hypertext is received, of transmitting a hypertext, to the terminal device, including tag information having location information defining location of image data corresponding to the stock quantity, and the tag information displaying the image data;

an image data request receiving process of receiving a request including the location information, transmitted from the terminal device which received the hypertext;

a stock-quantity information obtaining process, in the case where a request including the location information is received, of obtaining stock-quantity information defining the stock quantity corresponding to the location information from a database;

an image data generating process of generating image data indicating stock quantity shown by the obtained stock-quantity information in characters; and an image data transmitting process of transmitting the generated image data to the terminal device.

The invention according to claim 4 relates to an information transmitting and processing program for a computer included in an information transmitting apparatus for transmitting page information displaying stock quantity via a network to a terminal device, the terminal device displaying received data on displaying means thereof, storing the data in storing means provided for itself, and the terminal device, in the case where data to be received is already stored, obtaining the data from the storing means, and displaying the data on the displaying device, the program making the computer function as:

request receiving means for receiving a request transmitted from the terminal device;

hypertext transmitting means, in the case where a request for a hypertext generating the page information is received, for transmitting a hypertext, to the terminal device, including tag information having location information defining location of image data corresponding to the stock quantity, and the tag information displaying the image data;

stock quantity information obtaining means, in the case where a request including the location information is received from the terminal device which received the hypertext, for obtaining stock quantity information defining the stock quantity corresponding to the location information from a database;

image data generating means for generating image data indicating stock quantity shown by the obtained stock-quantity information in characters; and image data transmitting means for transmitting the generated image data to the terminal device.

The invention according to claim 5 relates to an information transmitting system which includes a terminal device, and an information transmitting apparatus for transmitting page information displaying stock quantity via a network to the terminal device, wherein the information transmitting apparatus comprises:

request receiving means for receiving a request transmitted from the terminal device;

hypertext transmitting means, in the case where a request for a hypertext generating the page information is received, for transmitting a hypertext, to the terminal device, including tag information having location information defining location of image data corresponding to the stock quantity, and the tag information displaying the image data;

stock-quantity information obtaining means, in the case where a request including the location information is received from the terminal device which received the hypertext, for obtaining stock-quantity information defining the stock quantity corresponding to the location information from a database;

image data generating means for generating image data indicating stock quantity shown by the obtained stock-quantity information in characters; and image data transmitting means for transmitting the generated image data to the terminal device, and wherein the terminal device comprises:

hypertext request transmitting means for transmitting a request for the hypertext to the information transmitting apparatus on the basis of an instruction from the user;

hypertext receiving means for receiving the hypertext transmitted from the information transmitting apparatus;

hypertext displaying means for displaying the received hypertext on displaying means thereof;

storing means for storing the received image data;

determining means for determining whether the image data corresponding to the location information of the tag information included in the received hypertext is stored in the storing means or not;

first image-data display means, in the case where the image data is not stored in the storing means, for transmitting a request including the location information to the information transmitting apparatus, receiving the image data transmitted from the information transmitting apparatus, and displaying the received image data on the displaying means; and second image-data display means, in the case where the image data is stored in the storing means, for displaying the stored image data on the displaying means.

The invention according to claim 6 relates to a recording medium in which the information transmitting and processing program according to claim 4 is computer-readably recorded.

Effect of the Invention

According to the invention, the number of times of obtaining stock-quantity information from a database by an information transmitting apparatus can be decreased.

MODE FOR CARRYING OUT THE INVENTION

Best modes for carrying out the present invention will be described in detail hereinbelow with reference to the drawings. The embodiments to be described below relate to the case of applying the present invention to a shopping system.

[1. Outline of Configuration and Function of Shopping System]

First, the configuration and schematic function of a shopping system S according to the embodiment will be described with reference to FIGS. 1 and 2.

Figure 1:
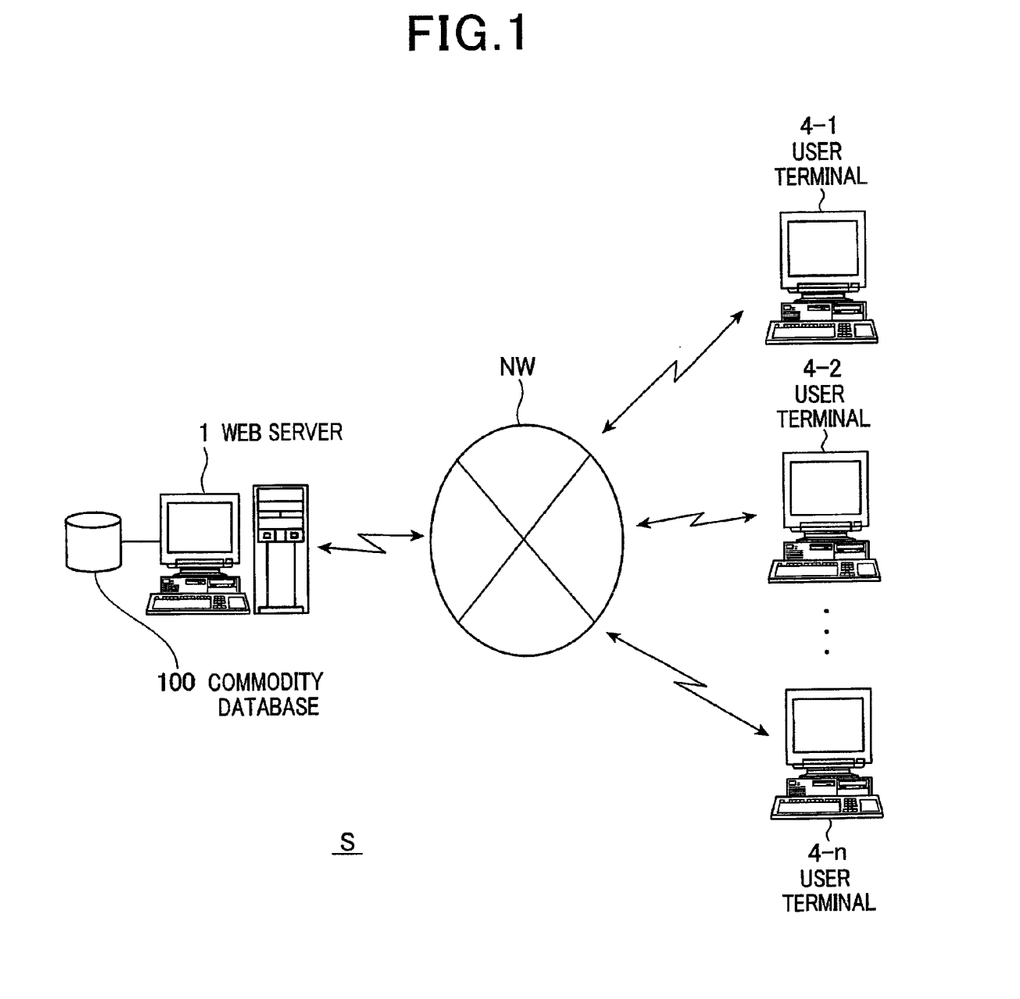
FIG. 1 is a diagram showing an example of a schematic configuration of a shopping system S according to an embodiment.

FIG. 1 is a diagram showing an example of a schematic configuration of the shopping system S according to the embodiment. FIG. 2 is a diagram showing a display example of a detailed commodity page 200.

As shown in FIG. 1, the shopping system S includes a web server 1 as an example of an information transmitting apparatus having a commodity database 100 as an example of a database, and user terminals 4-$k$ ($k$=1, 2, . . . n) as an example of a terminal device.

The web server 1 and the user terminals 4-$k$ are connected via a network NW and can transmit/receive data to/from each other using, for example, TCP/IP (Transmission Control Protocol/Internet Protocol) or the like as the communication protocol. A network NW1 is constructed by, for example, the Internet, a dedicated communication line (such as CATV (Community Antenna Television) line), a mobile body communication network (including a base station), a gateway, or the like.

In the shopping system S having such a configuration, the web server 1 is a server apparatus mounted to open a shopping site by a service provider that provides various services through the network NW.

Information such as stock quantity of commodities which are being sold and information on buying and selling of commodities is registered in the commodity database 100 provided in the web server 1.

The web server 1 performs a process to carrying out buying/selling of a commodity between a seller and the user of the user terminal 4-$k$ while accessing the commodity database 100 in accordance with a request of the user terminal 4-$k$.

The user terminal 4-$k$ accesses the web server 1 to obtain a web page and displays it on the displaying device. The user can purchase a commodity through the web page.

The user terminal 4-$k$ is, for example, a personal computer, a PDA (Personal Digital Assistant), or the like in which a browser application such as Internet Explorer (trademark) is installed, a cellular phone in which a program for browsing a web page is preliminarily installed, or the like. By such a program, the user terminal 4-$k$ has a cache function of storing various data received from the web server 1 at the time of browsing a web page (HTML (Hyper Text Markup Language) data (an example of a hypertext) constructing a web page, image data, and the like) in a RAM (Random Access Memory), a hard disk, or the like (an example of storing means), when the user browses the same web page next time, obtaining the stored data, and displaying the data on the displaying device.

Figure 2:
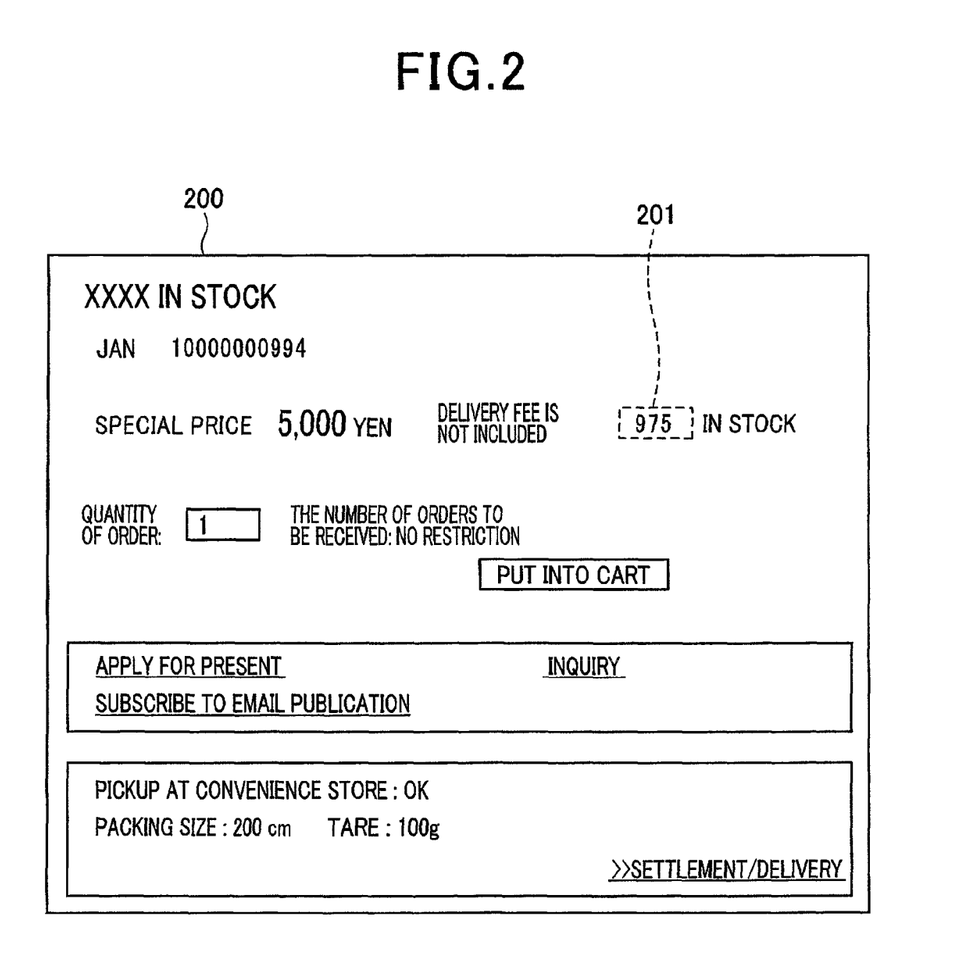
FIG. 2 is a diagram showing a display example of a detailed commodity page 200.

The web server 1 transmits a detailed commodity page 200 (an example of page information) displaying detailed information of a commodity as shown in FIG. 2 to the user terminal 4-$k$. The web server 1 transmits the detailed commodity page 200 displaying numerical characters of the stock quantity of commodities in the form of image data. In FIG. 2, reference numeral 201 denotes image data displaying the stock quantity (hereinbelow, called "stock quantity image data").

The user terminal 4-$k$ which received HTML data of the detailed commodity page 200 (hereinbelow, called "HTML data for detailed commodity"), the stock quantity image data displaying the stock quantity, and the like stores the data. Therefore, in the case where the stock quantity of the same commodity has to be displayed next time, the stored stock quantity image data is read and displayed. There is consequently a merit that time required for displaying in the user terminal 4-$k$ is shorter. Also on the web server 1 side, the number of times of receiving a request for the stock quantity image data decreases. As a result, it becomes unnecessary to obtain information of the stock quantity from the commodity database 100, and a process burden is lessened.

In this case, the stock quantity of the commodities is not reflected in a real-time manner. However, generally, in many cases, the user who views the details of a commodity just surfs the Internet or does not like the details of the commodity and does not purchase the commodity. Therefore, the degree of importance of the stock quantity is not so high at this stage. Consequently, even the stock quantity displayed on the detailed commodity page 200 is different from the actual stock quantity, it is not so problematic. However, at the stage when the user actually determines to purchase the commodity (for example, when the user puts the commodity into a cart in FIG. 2), if there are not commodities of the number to be purchased, an inconvenience occurs. In this case, the web server 1 obtains information of the stock quantity from the database 100.

[2. Configuration and Function of Web Server]

Next, the configuration and function of the web server 1 will be described with reference to FIGS. 3 and 4.

Figure 3:
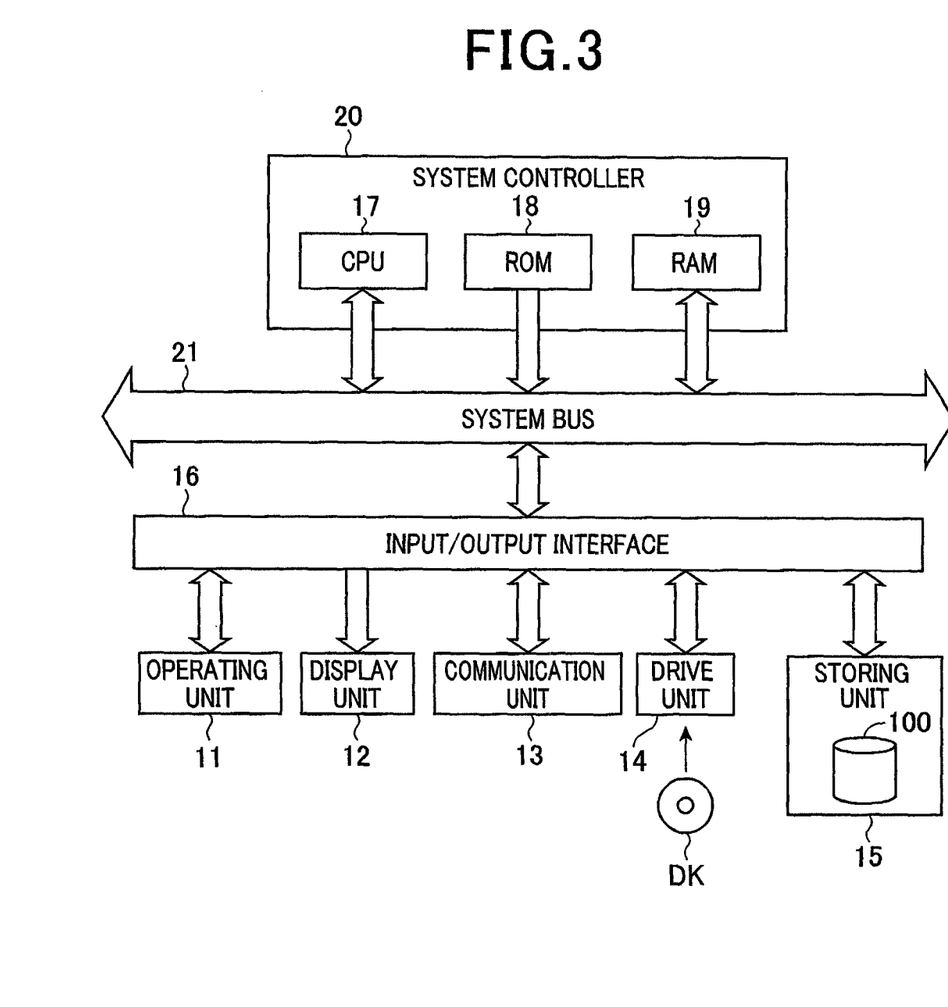
FIG. 3 is a block diagram showing an example of a schematic configuration of a web server 1 according to the embodiment.

FIG. 3 is a block diagram showing an example of a schematic configuration of the web server 1 according to the embodiment. FIG. 4 is a diagram showing an example of the details of HTML data for commodity details.

As shown in FIG. 3, the web server has an operating unit 11, a display unit 12, a communication unit 13, a drive unit 14, a storing unit 15, an input/output interface 16, and a system controller 20. The system controller 20 and the input/output interface 16 are connected to each other via a system bus 21.

The operating unit 11 is constructed by, for example, a keyboard, a mouse, and the like, receives an operation instruction from an operator or the like, and outputs the instruction as an instruction signal to the system controller 20. The display unit 12 is constructed by, for example, a CRT (Cathode Ray Tube) display, a liquid crystal display, or the like and displays information of characters, images, and the like. The communication unit 13 is connected to the network NW and the like and controls communication states with another server device, the user terminals 4-$k$, and the like. The drive unit 14 reads data from, for example, a disk DK such as a flexible disk, a CD (Compact Disc), or a DVD (Digital Versatile Disc) and records data or the like on the disk DK. The storing unit 15 is constructed by, for example, a hard disk drive and stores various programs, data, and the like. The input/output interface 16 performs interface process between the operating unit 11 to the storing unit 15 and the system controller 20. The system controller 20 is constructed by a CPU (Central Processing Unit) 17, a ROM (Read Only Memory) 18, a RAM 19, and the like.

In the storing unit 15, the commodity database 100 is constructed. In the commodity database 100, the name of a commodity, description information of detailed description, stock quantity information indicative of stock quantity of commodities, and the like is registered in association with a commodity ID (identification) for identifying the commodity on the commodity unit basis.

In the storing unit 15, various HTML data constructing a web page of a shopping site (including the HTML data for commodity details), image data, sound data, text data, and the like is stored.

Further, the storing unit 15 stores not only a predetermined operating system but also a WWW (World Wide Web) server program or the like for transmitting a web page to the user terminal 4-$k$ and the like on the basis of the various data stored in the storing unit 15 in accordance with a request transmitted from the user terminal 4-$k$ or the like by using the HTTP (Hyper Text Transfer Protocol).

Further, the web server 1 stores a shopping process program and the like for performing processes on sales, purchase, or the like of commodities in the shopping site.

The various programs and the like may be obtained, for example, from another server device or the like via the network NW or may be recorded on a disk DK such as CD-ROM and read via the drive unit 14.

The system controller 20 of the web server 1 is an example of request receiving means, hypertext transmitting means, stock quantity information obtaining means, image data generating means, image data transmitting means, and the like.

The system controller 20 of the web server 1 controls the components of the web server 1 by reading and executing various programs stored in the ROM 18 and the storing unit 15 by the CPU 17, and functions as the above-described means. The functions of the means will be described.

The system controller 20 as the request receiving means receives various HTTP requests transmitted from the user terminal 4-$k$.

When an HTTP request (an example of a request indicative of demand for a hypertext) in which the URL (Uniform Resource Locator) of HTML data for commodity details is written in the header is received, the system controller 20 as the hypertext transmitting means obtains the HTML data for commodity details indicated by the URL from the database 100, and transmits the HTML data to the user terminal 4-$k$.

Figure 4:
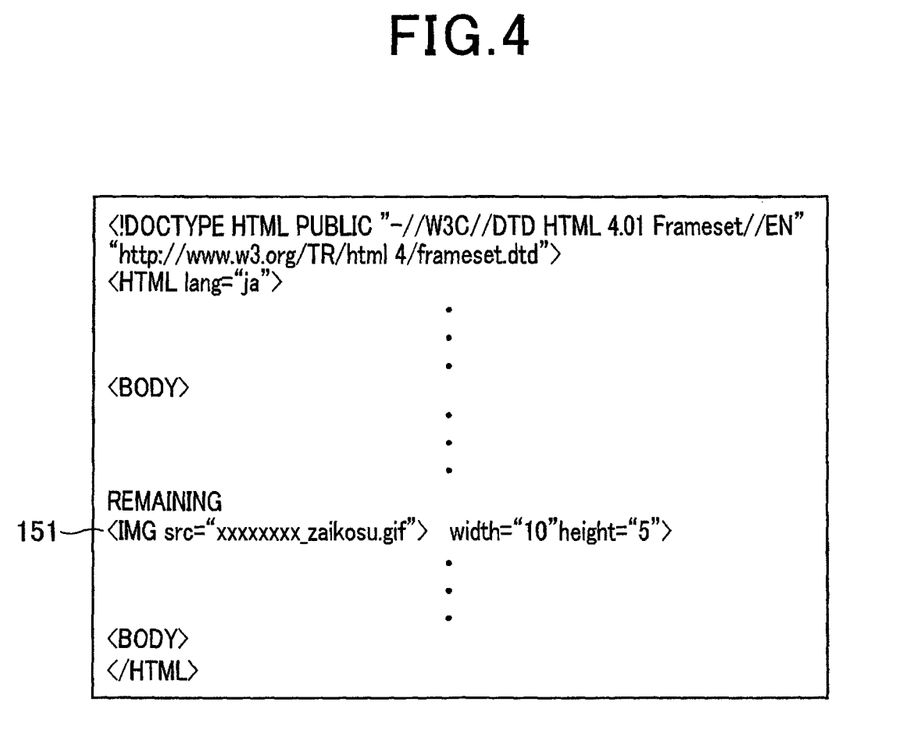
FIG. 4 is a diagram showing an example of the content of HTML data for the details of commodities.

The HTML data for commodity details is described as shown in FIG. 4. Reference numeral 151 in FIG. 4 denotes an IMG tag (an example of tag information). The IMG tag corresponds to display of stock quantity (stock quantity image data) indicated by the reference numeral 201 in FIG. 2. As the src attribute of the IMG tag, the URL (an example of location information) of the stock quantity image data corresponding to a commodity whose details are to be displayed is written. By making the commodity ID or the like included in the URL, the user can determine the commodity whose stock quantity is to be displayed.

When an HTTP request in which the URL of the stock quantity image data is written in the header (an example of a request including the location information) is received, the system controller 20 as the stock quantity information obtaining means specifies the commodity corresponding to the URL, and obtains the stock quantity information of the commodity from the database 100.

The system controller 20 as the image data generating means generates stock quantity image data displaying the numerical value of the stock quantity indicated by the obtained stock quantity information in characters (for example, reference numeral 201 in FIG. 2).

The system controller 20 as the image data transmitting means transmits the generated stock quantity image data to the user terminal 4-$k$ which made the request.

The commodity database 100 may be stored in a recording medium such as a hard disk of an NAS (Network-Attached Storage), and the web server 1 and the NAS may be connected via a LAN (Local Area Network). A server apparatus dedicated to control the commodity database 100 may be provided separately, and the web server 1 may transmit/receive data to/from the commodity database 100 via the server apparatus. A plurality of web servers may be provided and all of the web server may access one commodity database 100.

[3. Operation of Shopping System]

Next, the operation of the shopping system S will be described with reference to FIG. 5.

Figure 5:
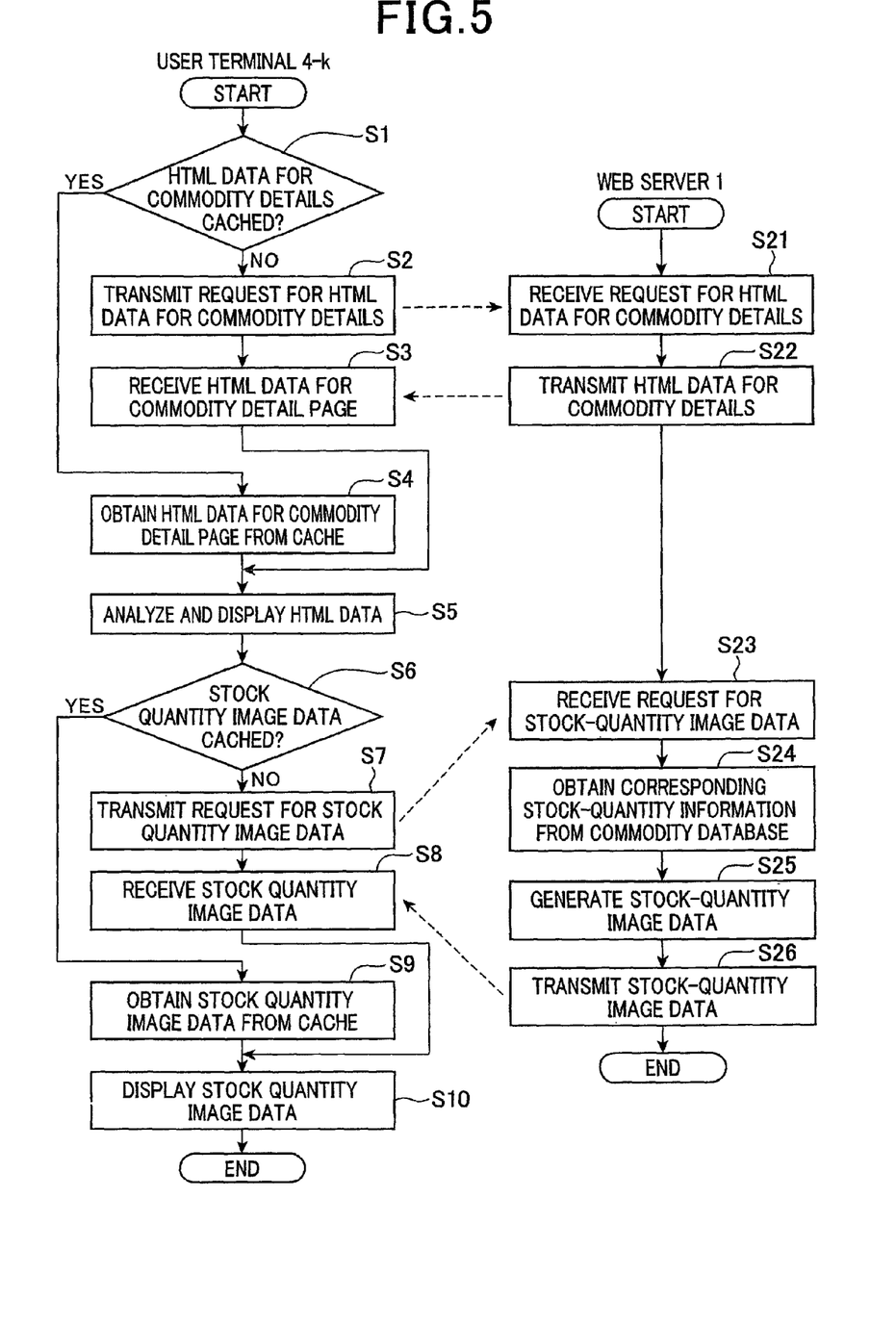
FIG. 5 is a flowchart showing a process example of a shopping system S according to the embodiment.

FIG. 5 is a flowchart showing a process example of the shopping system S according to the embodiment.

First, the user accesses a shopping site by operating the user terminal 4-$k$ and retrieves a commodity by a keyword search or the like. When the user selects a desired commodity from a page of a search result list from the web server 1, as shown in FIG. 5, the user terminal 4-$k$ determines whether the HTML data for commodity details of the selected commodity is cached or not (step S1). In the case where the HTML data for commodity details is cached (YES in step S1), the user terminal 4-$k$ obtains the HTML data for commodity details from the cache (step S4) and moves to step S5.

On the other hand, in the case where the HTML data for commodity details is not cached (NO in step S1), the user terminal 4-$k$ transmits a request for the HTML data for commodity details to the web server 1 (step S2). Concretely, the user terminal 4-$k$ transmits a GET method in which the URL of a link of the commodity selected by the user is set as the requested URL.

The system controller 20 of the web server 1 which received the HTML data request for commodity details (step S21) transmits the HTML data for commodity details corresponding to the request URL which is set to the user terminal 4-$k$ (step S22).

In the case where the HTML data for commodity details is received (step S3) or in the case where the HTML data for commodity details is obtained from the cache (step S4), the user terminal 4-$k$ analyzes the received or obtained HTML data for commodity details received or obtained and displays the data on the displaying device (step S5).

At this time, the user terminal 4-$k$ detects an IMG tag for displaying the stock quantity image data and determines whether the stock quantity image data is cached or not (step S6). In the case where the stock quantity image data is cached (YES in step S6), the user terminal 4-*k* obtains the stock quantity image data from the cache (step 9) and moves to step S10.

On the other hand, in the case where the stock quantity image data is not cached (NO in step S6), the user terminal 4-*k* transmits the stock quantity image data request to the web server 1 (step S7). Concretely, the user terminal 4-*k* transmits a GET method in which the URL which is set as the src attribute of the IMG tag as a request URL.

The system controller 20 of the web server 1 which received the request for the stock quantity image data (step S23) obtains stock quantity information corresponding to the set request URL from the commodity database 100 (step S24).

Subsequently, the system controller 20 generates the stock quantity image data which displays the stock quantity indicated by the obtained stock quantity information in characters (step S25), and transmits the stock quantity image data to the user terminal 4-*k* (step S26).

In the case where the stock quantity image data is received (step S8) or in the case where the stock quantity image data is obtained from the cache (step S9), the user terminal 4-*k* displays the received or obtained stock quantity image data on the displaying device (step S10). In such a manner, the detailed commodity page 200 is displayed as shown in FIG. 2.

In FIG. 5, even in the case where the HTML data for commodity details is cached (YES in step S1), the user terminal 4-*k* confirms whether the stock quantity image data is cached or not (step S6). The conformation is made because there is a case such that even when the HTML data for commodity details is cached, the stock quantity image data is not cached. For example, since a term of validity can be set for the stock quantity image data on the web server 1 side, when a term of validity of the stock quantity image data cached in the user terminal 4-*k* expires, the stock quantity image data may be deleted from the cache depending on the specification of the browser application.

On the other hand, on the web server 1 side, a term of validity may be set for the stock quantity image data. Since the frequency and possibility that the stock quantity is updated is higher as compared with the HTML data for commodity details itself, it is desirable to update the stock quantity (stock quantity image data to be cached) displayed by the user terminal 4-*k* at proper frequency. For example, by setting a term of validity of the stock quantity image data 10 minutes after generation of the data and using a term of validity for the HTML data for commodity details itself set by the browser application (for example, 20 days after caching), while decreasing the load on the web server 1, the stock quantity can be updated more accurately. Obviously, a term of validity for the HTML data for commodity details can be set on the web server 1 side.

To set expiry on the web server 1 side, it is sufficient to set date/time at which the stock quantity image data does not become invalid in an expires header or cache-control header as the HTTP header of a response when the system controller 20 transmits the stock quantity image data to the user terminal 4-*k*. During a period in which cached image data is valid, the user terminal 4-*k* obtains the image data from the cache and displays it on the displaying device. After a term of validity expires, the user terminal 4-*k* deletes the image data from the cache at this time point or the like or, even if the image data is not deleted, receives image data again from the web server 1, thereby updating the data in the cache.

As described above, according to the embodiment, on receipt of the HTML data request for commodity details, the system controller 20 of the web server 1 transmits the HTML data for commodity details including an IMG tag in which the URL of the stock quantity image data displaying the stock quantity of a corresponding commodity in characters is set as the src attribute to the user terminal 4-*k*. The user terminal 4-*k* displays characters of the stock quantity by an image on the basis of the IMG tag of the HTML data for commodity details received. In the case of displaying the stock quantity for the first time, since stock quantity image data is not cached, the user terminal 4-*k* transmits an image data request to the web server 1. In response to the request, the system controller 20 of the web server 1 obtains the stock quantity information from the commodity database 100, generates stock quantity image data, and transmits the data to the user terminal 4-*k*. The user terminal 4-*k* which received the stock quantity image data displays the stock quantity image data on the displaying device and also caches it. Once the stock quantity image data is cached, the user terminal 4-*k* displays the cached stock quantity image data on the displaying device without transmitting a request to the web server 1. Since no stock quantity image data request is received, the system controller 20 of the web server 1 does not have to obtain stock quantity information from the database. Therefore, the number of times of obtaining the stock quantity information from the database can be decreased.

In the above description, in the case where the HTML data for commodity details and the like is cached, the user terminal 4-*k* uses the cached data as it is without checking the last update date. Depending on the specification or setting of the browser application or the like, the user terminal 4-*k* inquires the web server 1 about the last update date and, in the case where the data is updated, makes a request to the web server 1. Generally, in the case of displaying displayed data again in the same session, it is often set that the last update date is not checked.

Depending on the setting of the browser application or the like, after lapse of predetermined period since stock quantity image data is received, the user terminal 4-*k* deletes the stock quantity image data from the cache. When it becomes necessary to display the stock quantity image data, the user terminal 4-*k* receives the stock quantity image data from the web server 1.

DESCRIPTION OF REFERENCE NUMERALS 1 web server
4-*k* user terminal
11 operating unit
12 display unit
13 communication unit
14 drive unit
15 storing unit
16 input/output interface
17 CPU
18 ROM
19 RAM
20 system controller
21 system bus
100 commodity database
NW network
S shopping system

What is claimed is:
1. An information transmitting apparatus for transmitting page information displaying stock quantity of a subject of transaction via a network to a terminal device, comprising:
 a request receiving unit that receives a request transmitted from the terminal device;

a hypertext transmitting unit, in the case where the request for a hypertext constituting the page information is received by the request receiving unit from the terminal device, that transmits a hypertext, to the terminal device, including tag information having location information defining a location of image data corresponding to the subject of transaction corresponding to the request and displaying the image data, and transmits a hypertext including tag information having the same location information on receipt of each of a plurality of the requests whose corresponding subjects of transaction are the same as each other;

a stock-quantity information obtaining unit, in the case where the request including the location information is received by the request receiving unit from the terminal device which received the hypertext, that obtains stock-quantity information defining the stock quantity of the subject of transaction corresponding to the location information from a database in which the stock-quantity information indicating the stock quantity and whose content changes is registered;

an image data generating unit that generates image data indicating stock quantity shown by the stock-quantity information obtained by the stock-quantity information obtaining unit in characters; and an image data transmitting unit that transmits the image data generated by the image data generating unit, to the terminal device;

wherein the request receiving unit, the hypertext transmitting unit, the stock-quantity information obtaining unit, the image data generating unit, and the image data transmitting unit include hardware and software necessary to execute the recited functions.

2. The information transmitting apparatus according to claim 1, the image data transmitting unit adds header information defining a term of validity of the generated image data to the image data, and transmits the resultant data to the terminal device.

3. The information transmitting apparatus according to claim 1, wherein the terminal device receives and displays the image data on a screen, and stores the image data in a storing unit of the terminal device, the terminal device, in the case where the image data to be received is not stored in the storing unit, transmits a request including the location information to the information transmitting apparatus, receives the image data transmitted from the information transmitting apparatus, and displays the received image data on the screen; and the terminal device, in the case where the image data to be received is already stored in the storing unit, obtains the image data from the storing unit, and displays the image data on the screen.

4. An information transmitting method of transmitting page information displaying stock quantity of a subject of transaction via a network to a terminal device, comprising:

a hypertext request receiving process of receiving a request for a hypertext constituting the page information, transmitted from the terminal device on the basis of an instruction from a user;

a hypertext transmitting process of, in the case where the request for the hypertext is received by the hypertext request receiving process from the terminal device, transmitting a hypertext, to the terminal device, including tag information having location information defining a location of image data corresponding to the subject of transaction corresponding to the request and displaying the image data, and transmitting a hypertext including tag information having the same location information on receipt of each of a plurality of the requests whose corresponding subjects of transaction are the same as each other;

an image data request receiving process of receiving a request including the location information, transmitted from the terminal device which received the hypertext;

a stock-quantity information obtaining process of, in the case where the request including the location information is received by the hypertext request receiving process from the terminal device which received the hypertext, that obtains stock-quantity information defining the stock quantity of the subject of transaction corresponding to the location information from a database in which the stock-quantity information indicating the stock quantity and whose content changes is registered;

an image data generating process of generating image data indicating stock quantity shown by the stock-quantity information obtained by the stock-quantity information obtaining process in characters; and an image data transmitting process of transmitting the image data generated by the image data generating process, to the terminal device.

5. A non-transitory recording medium having a computer-readable information transmitting and processing program recorded therein, the program being for a computer included in an information transmitting apparatus for transmitting page information displaying stock quantity of a subject of transaction via a network to a terminal device, the program making the computer function as:

a request receiving unit that receives a request transmitted from the terminal device;

a hypertext transmitting unit, in the case where the request for a hypertext constituting the page information is received by the request receiving unit from the terminal device, that transmits a hypertext, to the terminal device, including tag information having location information defining a location of image data corresponding to the subject of transaction corresponding to the request and displaying the image data, and transmits a hypertext including tag information having the same location information on receipt of each of a plurality of the requests whose corresponding subjects of transaction are the same as each other;

a stock-quantity information obtaining unit, in the case where the request including the location information is received by the request receiving unit from the terminal device which received the hypertext, that obtains stock-quantity information defining the stock quantity of the subject of transaction corresponding to the location information from a database in which the stock-quantity information indicating the stock quantity and whose content changes is registered;

an image data generating unit that generates image data indicating stock quantity shown by the stock-quantity information obtained by the stock-quantity information obtaining unit in characters; and an image data transmitting unit that transmits the image data generated by the image data generating unit, to the terminal device.

6. An information transmitting system which includes a terminal device, and an information transmitting apparatus for transmitting page information displaying stock quantity of a subject of transaction via a network to the terminal device, wherein the information transmitting apparatus comprises:

a request receiving unit that receives a request transmitted from the terminal device;

a hypertext transmitting unit, in the case where the request for a hypertext constituting the page information is received by the request receiving unit from the terminal device, that transmits a hypertext, to the terminal device, including tag information having location information defining a location of image data corresponding to the subject of transaction corresponding to the request and displaying the image data, and transmits a hypertext including tag information having the same location information on receipt of each of a plurality of the requests whose corresponding subjects of transaction are the same as each other;

a stock-quantity information obtaining unit, in the case where the request including the location information is received by the request receiving unit from the terminal device which received the hypertext, that obtains stock-quantity information defining the stock quantity of the subject of transaction corresponding to the location information from a database in which the stock-quantity information indicating the stock quantity and whose content changes is registered;

an image data generating unit that generates image data indicating stock quantity shown by the stock-quantity information obtained by the stock-quantity information obtaining unit in characters; and an image data transmitting unit that transmits the image data generated by the image data generating unit, to the terminal device, and wherein the terminal device comprises:

a hypertext request transmitting unit that transmits a request for the hypertext to the information transmitting apparatus on the basis of an instruction from the user;

a hypertext receiving unit that receives the hypertext transmitted from the information transmitting apparatus;

a hypertext displaying unit that displays the received hypertext on a screen;

a storing unit that stores the received image data;

a determining unit that determines whether the image data whose location is indicated by the location information which the tag information included in the received hypertext has is stored in the storing unit or not;

a first image-data display unit, in the case where the image data is not stored in the storing unit, that transmits a request including the location information to the information transmitting apparatus, receives the image data transmitted from the information transmitting apparatus, and displays the received image data on the screen; and a second image-data display unit, in the case where the image data is stored in the storing unit, that displays the stored image data on the screen.

\* \* \* \* \*